United States Patent
Joseph et al.

(10) Patent No.: US 6,802,219 B2
(45) Date of Patent: Oct. 12, 2004

(54) TIDE STAFF SYSTEM

(75) Inventors: Antony Joseph, Goa (IN); Shivanand Prabhudesai, Goa (IN); Suryakant Tengali, Goa (IN); Ehrlich Desa, Goa (IN); Prakash Mehra, Goa (IN); Amol Sukerkar, Goa (IN); Vijay Kumar, Goa (IN); Robert Monteiro, Goa (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/300,364

(22) Filed: Nov. 19, 2002

(65) Prior Publication Data

US 2004/0093940 A1 May 20, 2004

(51) Int. Cl.[7] ............................................... G01F 23/00
(52) U.S. Cl. ................ 73/290 R; 73/290 R; 73/170.06; 73/170.05; 73/306; 73/309; 73/311
(58) Field of Search ......................... 73/170.06, 170.05, 73/306, 309, 311, 209 R (56) References Cited

U.S. PATENT DOCUMENTS 3,869,911 A  *  3/1975  Levy ........................ 73/170.06

FOREIGN PATENT DOCUMENTS

FR        2741966 A1  *  6/1997 ........... G01F/23/02
GB        1396294      *  6/1975 ........... B63B/21/52

* cited by examiner

Primary Examiner—Hezron Williams
Assistant Examiner—André K. Jackson
(74) Attorney, Agent, or Firm—Drinker Biddle & Reath LLP (57) ABSTRACT

The present invention relates to a segmented cylindrical tide staff system [11] for erection at remote areas for dynamic calibration of electronic tide meters and computer models of tides, said tide staff system consisting of plurality of cylindrical tubes [12], said cylindrical tube being coupled to a flange [13] at its end through a circular orthogonal hole [20] drilled on a flat surface of the flange, said flange being provided with plurality of equally spaced slots [15] drilled on the flat surface of the flange, an outwardly protruding tide indicating arm [14] being mounted on the flange wherein said tide indicating arm consists of two mutually orthogonal planes [22] and [23], wherein plane [22] is perpendicular to the axis of the tide staff and plane [23] is parallel to the axis of the tide staff, said perpendicular plane [22] being provided with a mounting terminal [21] and a circular hole [27] and said parallel plane being partitioned into two compartments [24] and [25] by a separating line [26] thereby permitting indication of tide reading in more than one language, including a vernacular language and two or more cylindrical tubes being coupled to each other through slots [15] using coupling means.

15 Claims, 7 Drawing Sheets

Fig. 1

PRIOR ART

Fig. 2

PRIOR ART

TIDE STAFF SYSTEM

FIELD OF THE INVENTION

The present invention relates to a segmented cylindrical tide-staff system capable of being erected easily at remote areas for dynamic calibration of electronic tide meters and computer models of tides.

BACKGROUND OF THE INVENTION

The traditional method of coastal hydrographic surveying relies on a tide gauge, which is a device for measurement of tide levels. The tidal height at any place varies with time. The tide gauge records water heights with reference to a recognized datum level known as chart datum (CD), which is a safe low water level in order to maintain the minimum depth useful for transporting a vessel safely to port. The tide gauge records water heights at a selected specified time interval, usually 30 minutes. However, in regions where the tidal height changes rapidly, water heights need to be recorded at much closer time-intervals, say 5 minutes. Traditionally, in the ports all over the world, a human observer records readings from a tide-staff at selected specified time-intervals as described by David. T. Pugh ["*Tides, Surges and Mean Sea-Level: A Handbook for Engineers and Scientists*", David. T. Pugh, John Wiley and Sons, New York, pp. 1–472 (1987)]. The data recorded is primarily used for operational applications such as hydrographic survey and navigation. The tide-staff readings are also used for periodic chart-datum adjustment of graphical records obtained from float-driven tide gauges as described by H. R. Palmer ["Description of Graphical Register of Tides and Winds", H. R. Palmer, *Philos. Trans. Roy. Soc. London*, 121, 209–213 (1831)]. In hydrographic survey, the time-indexed tide is subtracted from time-indexed soundings to provide data for preparation of bathymetric maps, or nautical charts. With advances in nautical charting the application of tide-staff is going to become increasingly important for dynamic calibration of electronic tide gauges and computer models of tides as described by Antony Joseph [In: "Progress in the Technology of Nautical Charting", *Encyclopedia of Microcomputers*, Antony Joseph, Marcel Dekker, Inc, New York, Vol. 28, pp. 271–310 (2002)].

Figure 1:
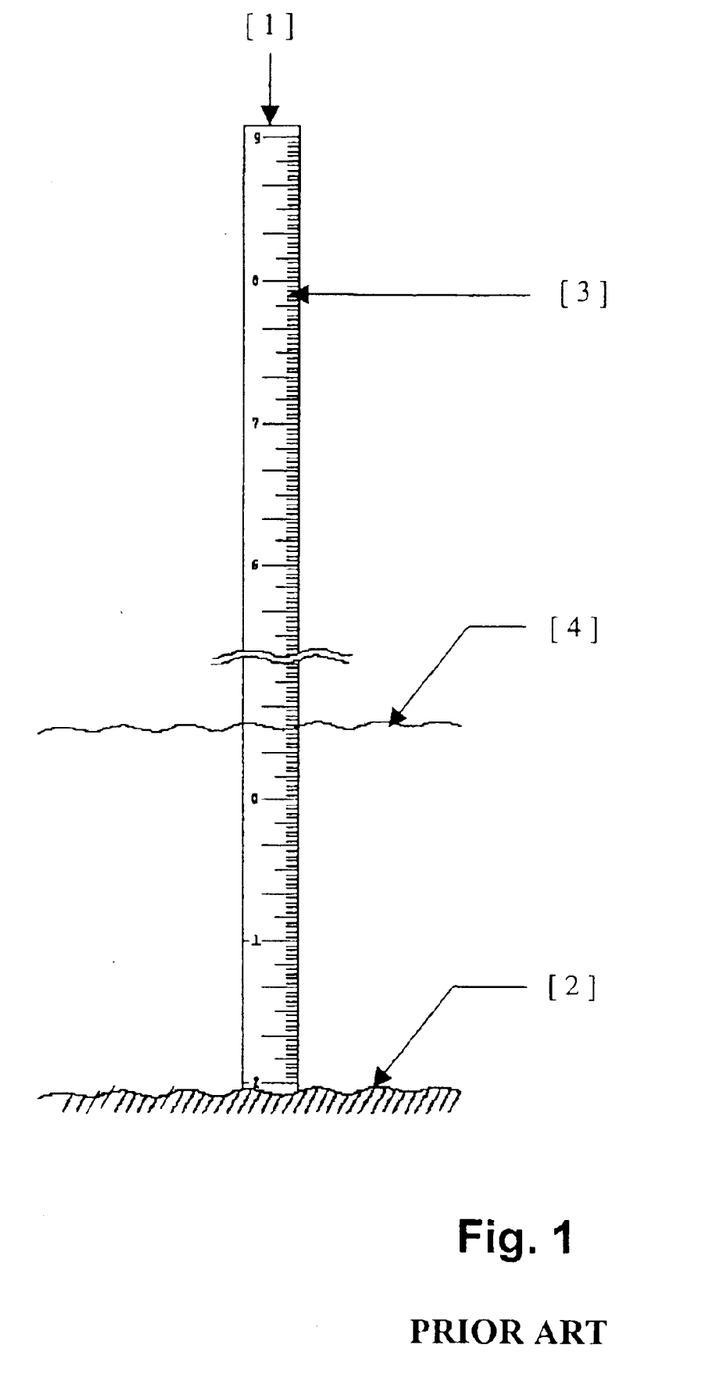
FIG. 1 represents a conventional system of the prior art used for tide level measurement with reference to chart datum (CD).
Figure 2:
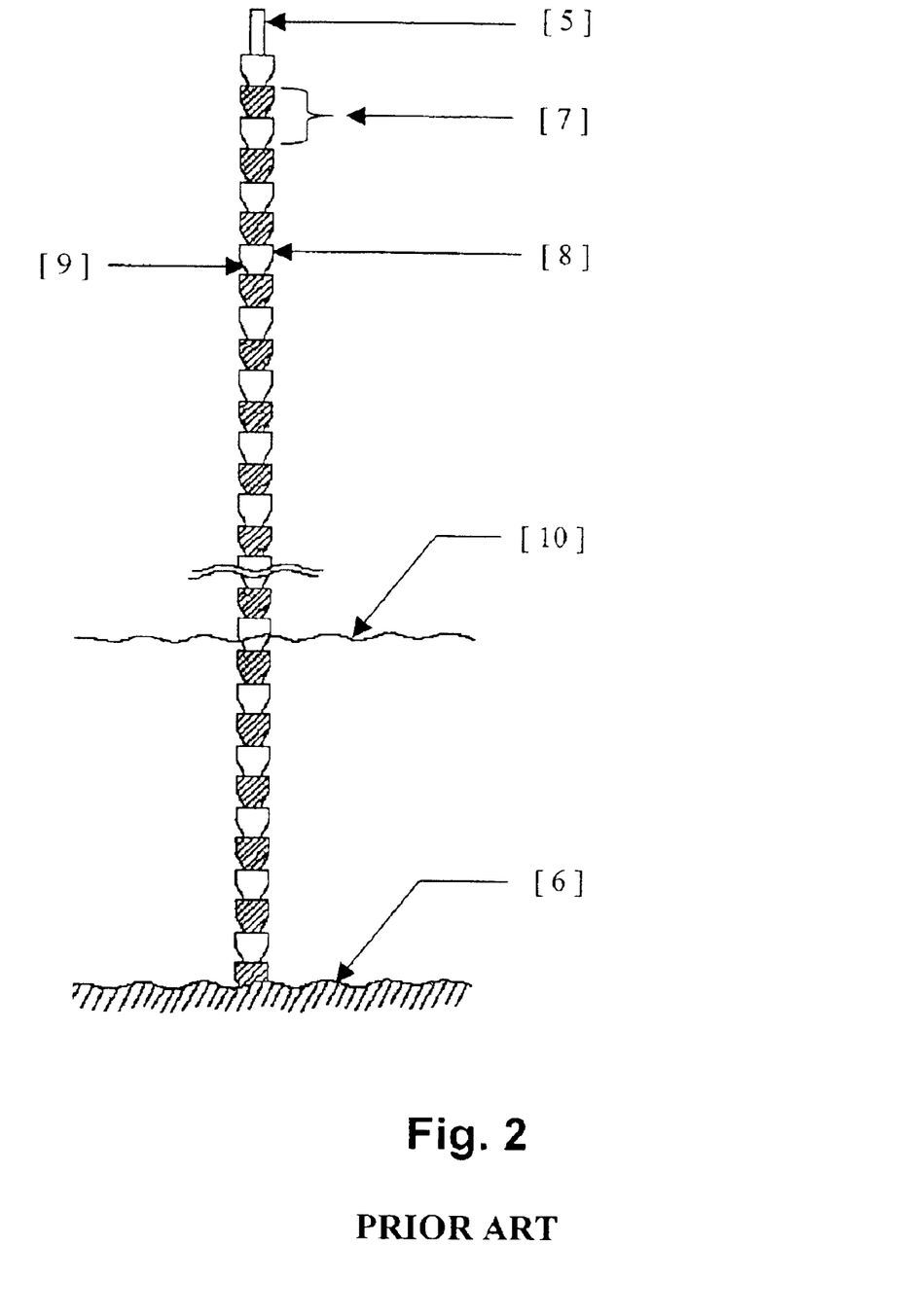
FIG. 2 represents another conventional system of the prior art used for tide level measurement with reference to chart datum (CD).

Hitherto known systems for tide measurement are shown in FIGS. 1 and 2. FIG. 1 represents a typical design example, showing a conventional tide-staff of the prior art used for tide level measurement with reference to the chart datum (CD), which consists primarily of a single graduated staff [1], which is usually made of wood or any similar material and either driven into the seabed [2] or erected vertically on the side of a jetty-wall. The tide staff reading [3] is in a form visually readable to an average person, and provides precise visual information from a close distance regarding the instantaneous tide level [4] at a given coastal site.

FIG. 2 represents another conventional system of the prior art used for tide level measurement with reference to chart datum (CD), which consists primarily of a single staff [5], which is usually made of iron or a conventional rail pole which is either driven into the seabed [6] or erected vertically on the side of a jetty-wall. Metallic strips [7] are welded to the iron staff [5]. Usually each strip has a total length of 20 cm and is sub-divided into two parts [8] and [9] of length 10 cm each differing in shape to distinguish between these two parts. The adjacent strips of the tide-staff are painted in differing colors to reduce the tide-observer's burden during tide-staff reading.

Hitherto known systems for tide measurement, describe a tide level recorder that records tide elevations utilizing a vertical free-floating graduated rod-staff, and time-tagging the tide level readings with the use of a chronometer [Jack E. Guth, "Photo-Tide Level Recorder", U.S. Pat. No. 4,268,839 dated May 19, 1981]. The tide level recorder comprises a vertically oriented graduated rod-staff, which is located on a plastic float to provide it sufficient buoyancy. The rod-staff, which is popularly known as tide-staff, is floated within the confines of a 6-inch diameter plastic vertical cylindrical tube, which functions as a tide-well. A T-shaped junction box attached to the tide-well near its upper end at a point above the highest expected tide level houses a chronometer, an index mark, a time-lapse camera, and a light flash synchronized with the camera. A plastic tube that is mounted vertically above the T-shaped junction box functions as a vertical guide for the rod-staff as it rises and falls with the tide. The tide-well has an orifice near its bottom end to allow the free flow of water in and out as the tide rises and falls. The length and diameter of the tide-well, rod-staff, and rod-staff guide tube, and the height of the index mark and the camera above the orifice are variable and depend on the tidal range, i.e., the extend of vertical swing in water level at the place. The orifice dampens external wave action. The elevation of the rod-staff is relative to the fixed index mark. This index mark is located at a fixed height above the orifice, and its level with reference to a local benchmark can be ascertained from conventional survey techniques. The index mark enables reading the rod-staff graduations as the staff rises and falls with the tide. An automatic time-lapse camera located opposite the index mark enables recording the rod-staff graduation readings and simultaneous time-readings from a chronometer, which is located near the index mark. This arrangement enables relating the tide elevation record to specific times of the day, during which the rod-staff readings are made. An advantage of this device is that it eliminates mechanical errors evident in float-driven gauges operating with the support of counter weights and springs as described by Antony Joseph ["Modern Techniques of Sea Level Measurement", *Encyclopedia of Microcomputers*, Antony Joseph, Marcel Dekker, Inc., New York, Vol. 23, pp. 319–344, (1999)]. Another advantage of this system is that by photo-recording the staff elevation from a fixed camera platform, relative to a fixed reference level, it eliminates the need for the presence of a human tide-staff reader for direct reading of the tide level on the staff. However, a major disadvantage of this device is that it requires a purpose-built structure for erection of the tide-well and related components. Another disadvantage is the requirement of a long tube to guide the tide-staff. Such a long tube is impractical in a location where wind force is appreciable. Yet another disadvantage of this device is that it is not amenable to trouble-free transportation to remote areas and, therefore, not suitable for short-term tide measurements from a multiplicity of remote areas. Still another disadvantage is that the cost of the tide system is very high.

PCT No. PCT/JP91/00610 dated Mar. 4, 1992; and U.S. Pat. No. 5,363,307 dated Nov. 8, 1994 titled "Measuring Apparatus Having an Indicator for Displaying Tide or Tidal Current Data" by Noriyuki Yoshida and assigned to Furuno Electric Company, Limited, Hyogo, Japan describe an apparatus which displays tide data (among other navigational data) and is installable on a ship. The apparatus comprises a multiplicity of navigational aids including a memory having stored tide data corresponding to ages of the moon in relation to points on the earth, data storing means for storing map data of an area, a ship-position measuring means including one of a Global Positioning System (GPS) receiver for inputting the geographical position (i.e., latitude and longitude) of the ship for specifying a given point of the stored map data, a time-measuring means for inputting the date and time at which the latitude and longitude are calculated, a data searching means for reading relevant tide data that is already stored in the memory based on the calculated latitude & longitude and the date & time; and an indicator for displaying tide data searched by the data searching device. An advantage of this system is that it is useful for hydrographic survey and navigational applications. A disadvantage of this tide display apparatus is its dependence on real-time predicted tide and the absence of tide-measurement to support/validate the predicted values. Another drawback of this apparatus is that the predicted tides stored in the computer memory in the form of Tide Tables are voluminous, as they represent tides data corresponding to the ages of the moon at many points throughout the navigation area. Yet another drawback of this tide display apparatus is that such a predicted Tide Table does not take into account the real situation wherein the tides at a given place can have significant meteorological components such as influences from variable atmospheric pressure and wind.

U.S. Pat. No. 6,295,248 B1 dated Sep. 25, 2001 by Chiaki Nakamura titled "Electronic Tide Meter, Method for Calculating a High/Low Tide Time and Computer Algorithm for Executing the Same" and assigned to Seiko Instruments Inc, Japan describe an electronic tide meter wherein the timing of a tide (i.e., when a high tide or a low tide occurs) at a user-selected geographic region and calendar date is calculated based on a computer algorithm using empirically-obtained regional tide data, and the results are displayed. This tide meter comprises an input unit for selecting a geographic region and inputting a calendar date; storing means for storing tide data for each of a plurality of geographic regions; an operating means for determining the tide level at a given time at a given geographic location based on the harmonic constants (representing one of an amplitude and a delay angle in phase) of each basic tidal constituent in the given geographic region determined in accordance with the selected calendar date, and comprising a Fourier series represented by the superposition of the basic constituents obtained from tide level changes in the selected geographic region. In this electronic tide meter a ROM storing means stores an angular speed for each tidal constituent, a correction delay angle and a harmonic constant for each of the plurality of geographic regions that are available for selection by the user. The timing of a tide (i.e., when a high tide or a low tide occurs) is calculated at high speed using a computer algorithm, wherein a whole-day tide level is first determined at certain rough time intervals using a tide level estimation and from the estimated tide data the extreme values (i.e., high tide and low tide values) are derived by an approximation method, based on the change in sign (i.e., a point of inflexion) in the displacement between successive tide levels (i.e., tide-difference changes) in the tide data time-series. Subsequently, a tide level is again determined by a fine time-interval for a limited period near high/low tides. This process yields a better-resolved extreme value of tide corresponding to a proper time-interval representing a given high/low tide phase of the tide, which is of navigational interest. The extreme value as a high tide or low tide level is calculated for a high tide time and low tide time based on a better resolved true points of inflexion, shortening the computer program execution time. An advantage of this system is that it is useful for navigational applications in coastal and estuarine waters. A drawback of this Electronic Tide Display Apparatus is the absence of calibration of the estimated high- and low-tide values against a network of reference-tide-measuring-devices such as tide-staffs that are tied to the local/regional survey benchmark levels, and lack of true measurements to support the predicted high/low tide levels and their true times of occurrence.

U.S. Pat. No. 5,847,567 dated Dec. 8, 1998 by John A. Kielb, Randy J. Longsdorf, Grant B. Edwards, and Donald F. Palan, titled "Microwave Level Gauge with Remote Transducer", and assigned to Rosemount Inc., Eden describe a level meter for measuring levels of any product including water levels using the principle of microwave echo ranging. The level meter includes a microwave feed-horn directed into the level to be measured, an electronics housing spaced apart from the feed-horn, and a microwave waveguide connecting them. A microwave transducer in the housing couples to the wave-guide and sends & receives microwave signals. A microprocessor in the housing identifies the microwave echoes that are generated and sensed by the microwave transducer. The microprocessor estimates the height of the water level based upon a microwave echo from the water level and another microwave echo from the feed-horn. The microprocessor compensates for the effects of propagation delay through the wave-guide on level measurements with the feed-horn echo and provides an output related to the height of the level that is desired to be measured. An advantage of this system is that the level measurements are performed with reference to the level of the feed-horn. This feed-horn can be leveled against a local benchmark to obtain tide level measurements with reference to the Chart Datum (CD), which is the internationally accepted reference level for tide measurements. A major disadvantage of this system is the requirement of a purpose-built structure and a cabin for protection of its electronics and the display system, thereby operating as a major impediment in its use in remote areas for tide level measurements.

U.S. Pat. No. 6,360,599 B1 dated Mar. 26, 2002 by Ardhendu Gajanan Pathak and Gidugu Ananda Ramadass titled "Device for Measuring Liquid Level Preferably Measuring Tide Level in Sea" and assigned to National Institute of Ocean Technology, Department of Ocean Development, Government of India, Chennai, India describe a device and process for measuring tide levels using the principle of acoustic echo ranging. In this device, an ultrasonic transducer mounted in air and vertically looking downwards directs acoustic energy down towards the water/air interface. The acoustic energy gets reflected back from this interface to the acoustic transducer. The distance between the transducer and the water/air interface is estimated by measuring the time taken between transmission and reception of an energy pulse and from knowledge of velocity of sound in air. From this information the tide level with reference to a known datum can be estimated. This acoustic tide gauge comprises an acoustic transducer or a pair of acoustic transducers for generation and reception of acoustic signals, a mechanical system comprising an acoustic-signal guide-tube, means for calibration, stilling-well and fixtures to erect the system at the site, and an electronic circuit for generation, processing, and displaying of the tide data. Stilling-well is used as a mechanical protection to the acoustic-signal guide-tube against the impact of ocean waves and currents, and also to minimize the effect of water currents and waves on the water level inside the guiding tube. The entire assembly has provisions for fixing the tide gauge to a suitable structure for field-measurements of the tide level. The acoustic transducer/transducer-pair is positioned at the upper end of the acoustic signal-guide-tube having its lower open-end immersed below the lowest tide level. A digital-to-analog converter is used for generation of electrical signals of suitable pulse-width and frequency. A switching circuit isolates the transmitting and receiving signals, and a power amplifier amplifies the received signals. A multiplicity of side-branch tubes provided on the guide tube reflects the sound pulses with a large signal-to-noise ratio. The sounding/guiding tube helps isolate the transducer from other sources of interference, and also confines the ultrasonic beam so that it is directed vertically towards the region of the water surface directly below the acoustic transducer. Further more, the tube produces within it a region of water surface that is substantially damped of waves. The side branches are designed to respond to a specific frequency such that the sound pulse with appropriate center frequency is predominantly reflected by the branch thereby providing a means for in-situ calibration of the acoustic tide gauge by measuring the effective velocity of sound at different portions of the sounding tube. The length of the side-branch, which plays an important role in its effectiveness as a calibrator, is an odd multiple of the quarter wavelength for a given transmission frequency of sound. By the use of properly tuned resonating side branches and signals of different frequencies for calibration and for measurement of the tide level, the limitations existing in in-situ calibration are overcome. The accuracy of tide level measurement depends on the velocity of sound, which varies with temperature gradient of the air column within the sounding tube. The in-situ calibration obviates the basic problem of variation of sound velocity due to temperature gradient in the air within the sounding tube in the axial direction. The length of the said branch tube is determined by a formula that takes into account the wavelength and velocity of the sound signals so as to achieve maximum reflection of acoustic signal. The improved signal-to-noise ratio leads to the improvement in the accuracy of tide level measurement. The diameter of the guide tube is determined by another formula that takes into account the wavelength of the sound signals for realizing plane wave propagation within the guide tube for achieving higher accuracy. An advantage of this system is that the water level measurements are performed with reference to the level of the acoustic transducer. The acoustic head of this transducer can be leveled against a local benchmark to obtain tide level measurements with reference to the internationally accepted reference level for tide measurements, known as Chart Datum (CD). A drawback of this system is that for its efficient full-length in-situ calibration during differing phases of the tide it becomes necessary to attach a series of resonating side-branch tubes of differing lengths at several points on the sounding tube at differing distances from the acoustic head. This makes the system unwieldy. Another disadvantage with this gauge is that it is not possible to achieve the mandatory plane wave propagation condition for the sounding tube for all the differing acoustic transmission frequencies because of a mathematical relationship between the wavelength of the acoustic transmission signal and the diameter of the guiding tube. Still another disadvantage with this gauge is the requirement for a much larger diameter stilling well because of the presence of the protruding resonating side-branches. A further limitation of this tide gauge is the practical difficulty in the installation of the sounding tube locators between the exterior portion of the tubular sounding tube and the interior portion of the stilling-well because of the presence of the resonating side-branches.

A major disadvantage of this system is the requirement of a purpose-built structure and a cabin for protection of its electronics and the display system, thereby operating as a major impediment in its use in remote areas for tide level measurements.

Thus there is a need to develop a tide staff system which is easy to transport, facilitates utilization of the services of local manpower for registering tide level readings and eliminates the ambiguity prevalent in the measurements.

OBJECTS OF THE INVENTION

The main object of the present invention is to facilitate trouble-free transportation of tide-staffs for tide level measurements from any region including remote areas, by providing a means for partitioning the tide-staff into a multiplicity of desirable smaller segments.

Another object of the present invention is to facilitate easy coupling of any pair of a plurality of separate segments of tide-staffs to achieve any desired height for the full-length tide-staff to suit any given installation environment and any given tidal regime.

Yet another object of the present invention is to provide enhancement of precision in tide level measurements from tide-staffs by providing a multiplicity of protruding tide-indicating arms at regular spatial intervals in an axial direction on their body, thereby eliminating the hitherto prevalent ambiguity in the measurements of tide levels from tide-staffs located at far distances.

Still another object of the present invention is to improve the efficiency of assembly, de-assembly, and packing of the tide-staff system by rendering the tide-indicating arms compact and dismountable.

A further object of the present invention is to simultaneously achieve elegance, ease in mounting, and improving the readability of the tide-indicating arm of a tide-staff by providing the said tide-indicating arm with two mutually orthogonal planes that are drawn from a single strip.

A still further object of the present invention is to facilitate utilization of the services of local manpower for registering tide level readings from remote areas such as coastal villages and fishing areas by providing means for indication of tide reading in more than one language including a vernacular language.

Another object of the present invention is to achieve excellent horizontal azimuthal response to the tide-staff in the presence of flows and waves and to minimize flow/wave-induced piling-up/piling-down effects and wake effects at the tide-staff, by providing a cylindrical shape to the tide-staff segments.

BRIEF DESCRIPTION OF THE ACCOMPANYING DRAWINGS

In the drawings accompanying this specification.

SUMMARY OF THE INVENTION

Accordingly, the present invention relates to a segmented cylindrical tide staff system [11] for erection at remote areas for dynamic calibration of electronic tide meters and computer models of tides, said tide staff system consisting of plurality of cylindrical tubes [12], said cylindrical tube being coupled to a flange [13] at its end through a circular orthogonal hole [20] drilled on a flat surface of the flange, said flange being provided with plurality of equally spaced slots [15] drilled on the flat surface of the flange, an outwardly protruding tide indicating arm [14] being mounted on the flange wherein said tide indicating arm consists of two mutually orthogonal planes [22] and [23], wherein plane [22] is perpendicular to the axis of the tide staff and plane [23] is parallel to the axis of the tide staff, said perpendicular plane [22] being provided with a mounting terminal [21] and a circular hole [27] and said parallel plane being partitioned into two compartments [24] and [25] by a separating line [26] thereby permitting indication of tide reading in more than one language, including a vernacular language and two or more cylindrical tubes being coupled, to each other through slots [15] provided on the flange using coupling means.

DETAILED DESCRIPTION OF THE INVENTION

In accordance with the aforesaid objects, the present invention provides a segmented cylindrical tide-staff system useful for erection at remote areas and dynamic calibration of electronic tide meters & computer models of tides, which provides for (1) partition of tide-staffs into a multiplicity of desirable smaller segments, thereby enabling their trouble-free transportation to remote areas; (2) easy coupling of any pair of a plurality of separate segments to achieve any desired height for the tide-staff to suit any given installation environment and any given tidal regime; (3) enhancement of unambiguous measurements of tide levels from a distance by providing a pair of protruding tide-indicating arms on either end of each segment; (4) improvement in the efficiency of assembly, de-assembly, and packing of the tide-staff system by rendering the tide-indicating arms compact and dismountable; (5) cylindrical shape to the segments to minimize flow/wave-induced piling-up/piling-down effects and wake effects, and to achieve excellent horizontal azimuthal response to tide-staff in the presence of flows and waves; (6) simultaneously achieving elegance, ease in mounting, and improving the readability of the tide-indicating arm by providing it with two mutually orthogonal planes that are drawn from a single strip; and (7) means for indication of tide reading in more than one languages including a vernacular language, thereby facilitating services of local manpower for making tide level readings from remote areas such as coastal villages and fishing areas.

More preferably, the present invention provides a segmented cylindrical tide staff system [11] for erection at remote areas for dynamic calibration of electronic tide meters and computer models of tides, said tide staff system consisting of plurality of cylindrical tubes [12], said cylindrical tube being coupled to a flange [13] at its end through a circular orthogonal hole [20] drilled on a flat surface of the flange, said flange being provided with plurality of equally spaced slots [15] drilled on the flat surface of the flange, one or more outwardly protruding tide indicating arms [14] being mounted on the flange wherein said tide indicating arm consists of two mutually orthogonal planes [22] and [23], wherein plane [22] is perpendicular to the axis of the tide staff and plane [23] is parallel to the axis of the tide staff, said perpendicular plane [22] being provided with a mounting terminal [21] and a circular hole [27] and said parallel plane being partitioned into two compartments [24] and [25] by a separating line [26] thereby permitting indication of tide reading in more than one language, including a vernacular language and two or more cylindrical tubes being coupled to each other through slots [15] provided on the flange using coupling means.

In an embodiment of the present invention, the flange [13] is designed to minimize flow/wave-induced wakes during deployment of the tide staff in tidal regime.

In another embodiment of the present invention, the flange [13] has smooth edges thereby avoiding injuring persons during transportation, erection, dismounting of tide staff and minimizing wake formation at the edges in presence of water currents and sea surface waves.

In yet another embodiment of the present invention, the flange [13] is circular.

In still another embodiment of the present invention, the cylindrical tube [12] is constructed of hollow galvanized iron (G.I.) pipes.

In one more embodiment of the present invention, the diameter of the circular orthogonal hole [20] on the flange [13] is equal to the outer diameter of the cylindrical tube [12].

In one another embodiment of the present invention, the flange [13] is coupled orthogonal to the axis of the cylindrical tube [12].

In a further embodiment of the present invention, the flange is provided with 3 or more equally spaced slots [15] for coupling to or more cylindrical tubes [12].

In an embodiment of the present invention, threading is provided on an inner of the orthogonal hole [20].

In another embodiment of the present invention, the ends of the circular tube are provided with threading for coupling the tube to the flange.

In yet another embodiment of the present invention, the flange is first tightened to the end of the circular tube and is subsequently welded.

In still another embodiment of the present invention, the circular tube is subdivided into a plurality of equal segments [16] to facilitate reading of tide level.

In one more embodiment of the present invention, adjacent sub segments [16] on the circular tube are painted in two or more differing colors to facilitate reading of tide level.

In one another embodiment of the present invention, two or more cylindrical tubes being coupled to each other using nuts [18] bolts [17] and lock nuts [19].

In a further embodiment of the present invention, the nuts, bolts and lock nuts are made of stainless steel to prevent rusting during prolonged exposure of the tide staff to saline water medium.

In an embodiment of the present invention, the tide indicating arm is mounted in an orthogonal direction to the axis of the tide staff for easily and unambiguously taking the tidal measurements.

In another embodiment of the present invention, an edge of the mounting terminal [21] is curved to permit easy orientation of the tide indicating arm in any desired orthogonal direction with reference to the axis of the tide staff.

In yet another embodiment of the present invention, the tide indicating arm [14] is mounted on the flange [13] through the hole [27] provided on the mounting terminal [21].

In still another embodiment of the present invention, the tide indicating arm [14] is mounted on the flange [13] using nuts [18] bolts [17] and lock nuts [19] already provided for coupling two or more cylindrical tubes.

In one more embodiment of the present invention, an edge of the parallel plane [23] is rounded thereby avoiding injuring persons during transportation, erection, dismounting of tide staff and providing optimum fluid dynamic performance.

In one another embodiment if the present invention, markings in the form of numbers are provided on the surface of the parallel plane [23] for reading the tide level.

In a further embodiment of the present invention, the sub-segments [16] can be painted in differing colors to facilitate tide level reading with lesser tedium.

In an embodiment of the present invention, the protruding tide-indicating arm [14] is mounted on the flange [13] in an orthogonal direction to the axis of the tide-staff to provide enhancement of precision in tide-level measurements using the tide-staff. Presence of this protruding arm eliminates the hitherto prevalent ambiguity in the measurements of tide levels from tide-staffs located at far distances from the shore, which is a usual occurrence is slowly sloping beaches.

In another embodiment of the present invention, the tide-indicating arm [14] is rendered compact and dismountable to achieve improvement in the efficiency of assembly, de-assembly, and packing of the tide-staff system.

In still another embodiment of the present invention, two mutually orthogonal planes [22] and [23] have been provided to the tide-indicating arm [14] by adequate heat treatment and application of shear forces at appropriate points on its body.

In yet another embodiment of the present invention, the two mutually orthogonal planes provided to the tide-indicating arm [14] simultaneously achieve elegance, ease in mounting, and enhancement in the readability of the tide level.

In a further embodiment of the present invention, the tide readings are inscribed in more than one language, including a vernacular language, thereby facilitating utilization of the services of local manpower for registering tide level readings from remote areas such as coastal villages and fishing areas.

In an embodiment of the present invention two outwardly protruding tide indicating arms are mounted on the flange.

In one another embodiment of the present invention, the tide level measurements are not influenced by variations in site-related factors such as water density, suspended sediments, air bubbles, or agitation effects as in other tide meters such as pressure gauges and float gauges as reported by Antony Joseph, Vijaykumar, Elgar Desa, Ehrlich Desa, and Vani B. Peshwe [in "Over-estimation of Sea Level Measurements Arising from Water Density Anomalies Within Tide-wells—A Case Study at Zuary Estuary, Goa", *Journal of Coastal Research*, Vol.18, No.2 (in press) (2002)]; and Antony Joseph, Ehrlich Desa, Elgar Desa, David Smith, Vani B. Peshwe, Vijaykumar and J. A. E. Desa [in "Evaluation of Pressure Transducers Under Turbid Natural Waters", *Journal of Atmospheric and Oceanic Technology, American Meteorological Society*, Vol.16, No.8, pp.1150–1155 (1999)].

The invention will now be described in detail with reference to the accompanying drawings.

Figure 3:
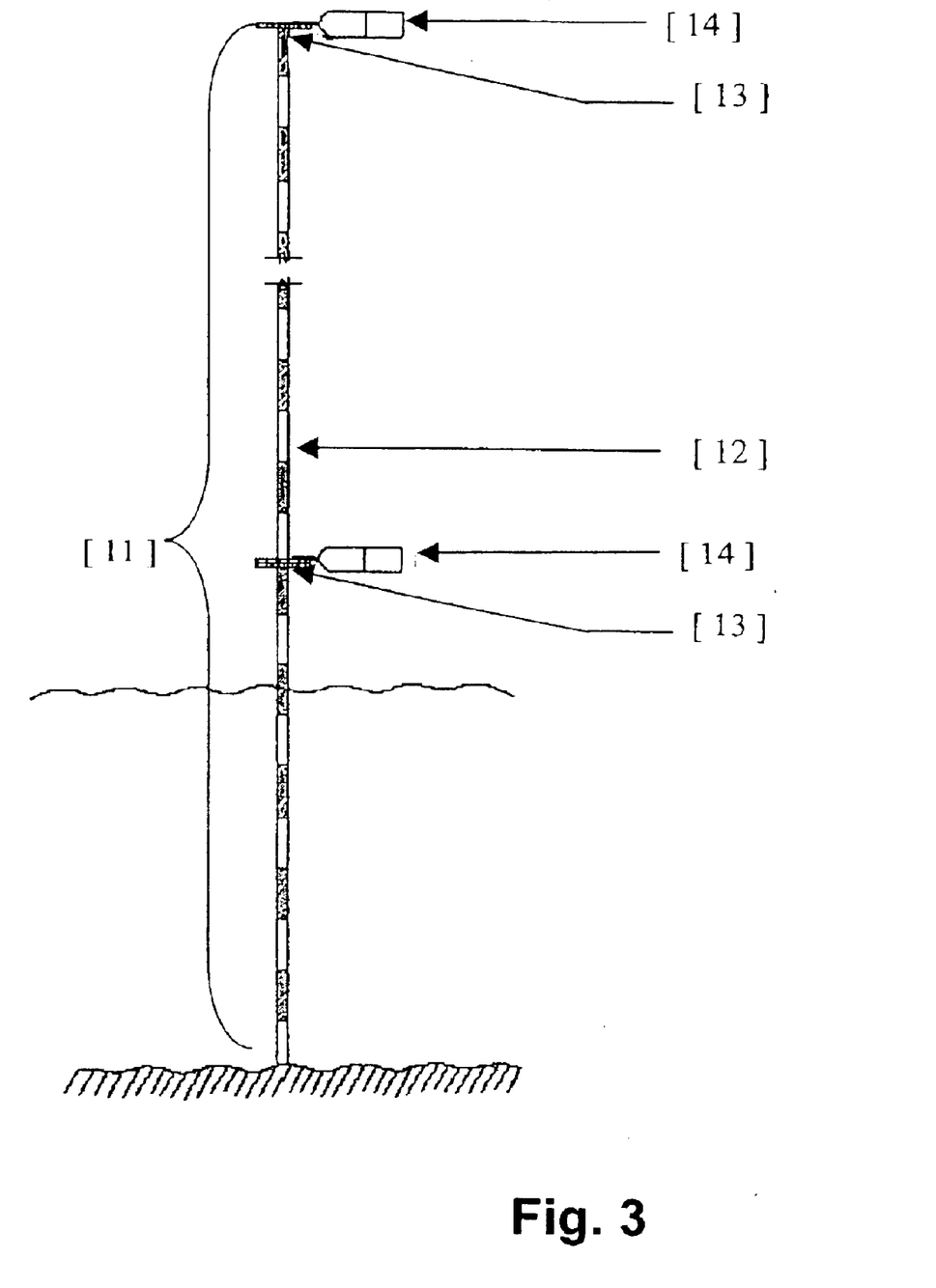
FIG. 3 shows the segmented cylindrical tide-staff system of the present invention useful for erection at remote areas and dynamic calibration of electronic tide meters & computer models of tides.

FIG. 3 shows the segmented cylindrical tide-staff system [11] of the present invention, which consists primarily of a multiplicity of desirable smaller segments [12], each segment [12] having a flange [13] at its either end. Circular shape is chosen for the flange [13] to minimize flow/wave-induced wakes during deployment of the tide-staff in the tidal regime, to provide good aesthetic appearance, and to avoid sharp edges that might hurt/injure the transporting personnel or those who erect the tide-staff. The edges of the flanges [13] are chamfered to avoid sharp edges, thereby enabling trouble-free handling of the tide-staff segments during transportation, installation, dismounting etc., and minimizing formation of wakes at its edges in the presence of water currents and sea-surface waves.

Figure 4:
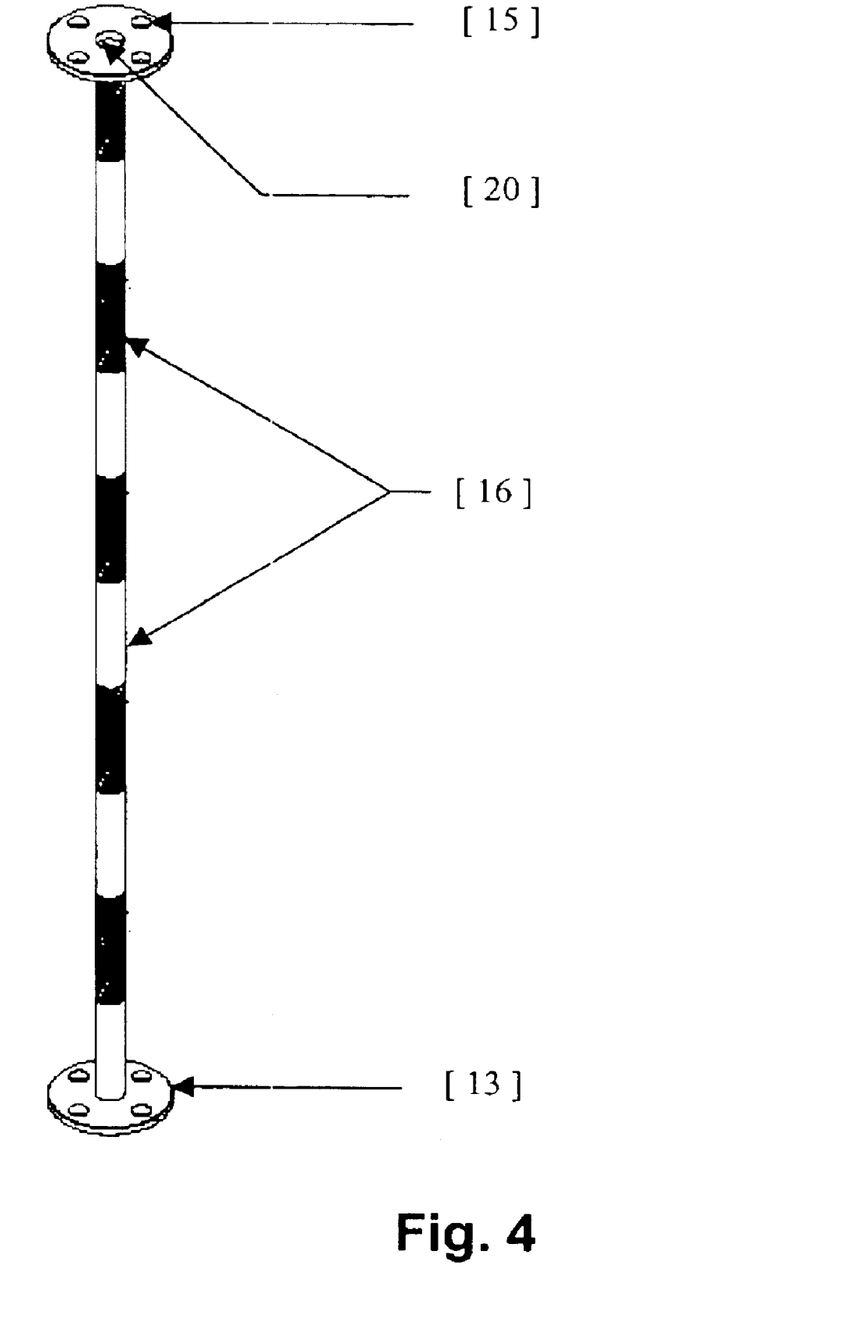
FIG. 4 illustrates one of the segments of the tide-staff of the present invention.

FIG. 4 shows a segment [12] of the tide-staff of the present invention. The said segment is cylindrical in shape to minimize wake formation and reduce piling-up/piling-down effects in the presence of water flows and surface waves in the water body. The segment [12] is constructed preferably from hollow galvanized iron (G.I) pipes to reduce weight and to minimize corrosion effects. A central hole [20], whose diameter is equal to that of the cylindrical shaped tide-staff segment, axially drilled on this flange [13] permits securing it orthogonal to the axis of the tide-staff segment by a process of threading and subsequent welding. Three or more number of equally spaced slots [15] provided on its flat surface permit firm coupling of the two adjacent segments of the tide-staff by bolts and nuts. The said segments are subdivided into an adequate number of smaller equal sub-segments [16] to facilitate tide level reading with the required resolution. These sub-segments [16] can be painted in differing colors to facilitate tide level reading with lesser tedium.

Figure 5:
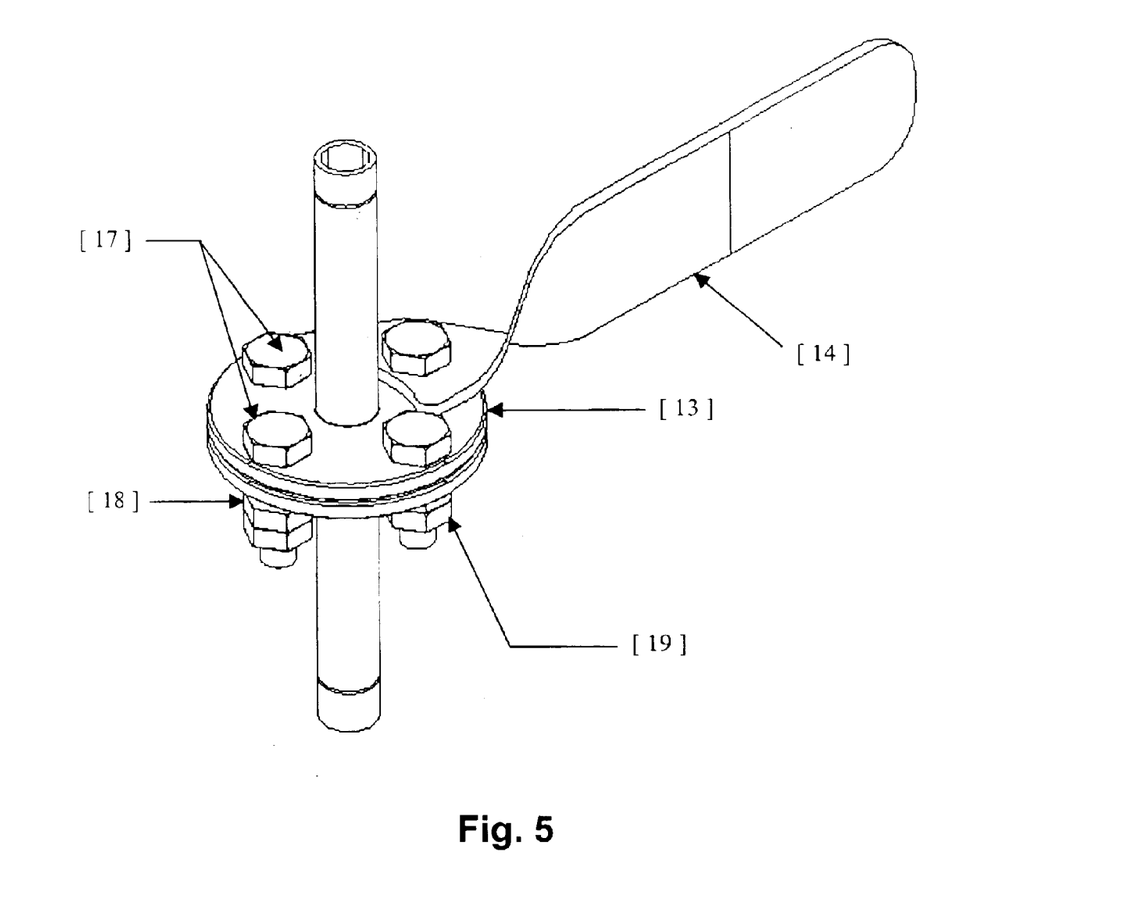
FIG. 5 indicates an isometric view of the coupling junction of the joints of two adjacent segments of the tide-staff and the mounting arrangement of the tide-indicating arm of the present invention.

FIG. 5 indicates an isometric view of the coupling junction of the joints of two adjacent segments of the tide-staff and the mounting arrangement of the tide-indicating arm of the present invention. The two adjacent segments of the tide-staff are joined by bolts and nuts, with the support of four numbers of equally spaced slots provided on the flat surface of the circular flange [13]. The bolts [17] are preferably chosen from stainless steel material to prevent corrosion and rusting during prolonged exposure to the saline water of the tidal regime. The nuts [18] and the lock nuts [19] are preferably chosen from stainless steel material for the reasons applicable to the choice of stainless steel bolts, as indicated above. The protruding tide-indicating arm [14] mounted on the flange [13] in an orthogonal direction to the axis of the tide-staff provides enhancement of precision in tide-level measurements using the tide-staff. Presence of this protruding arm eliminates the hitherto prevalent ambiguity in the measurements of tide levels from tide-staffs located at far distances from the shore, which is a usual occurrence is slowly sloping beaches.

Figure 6:
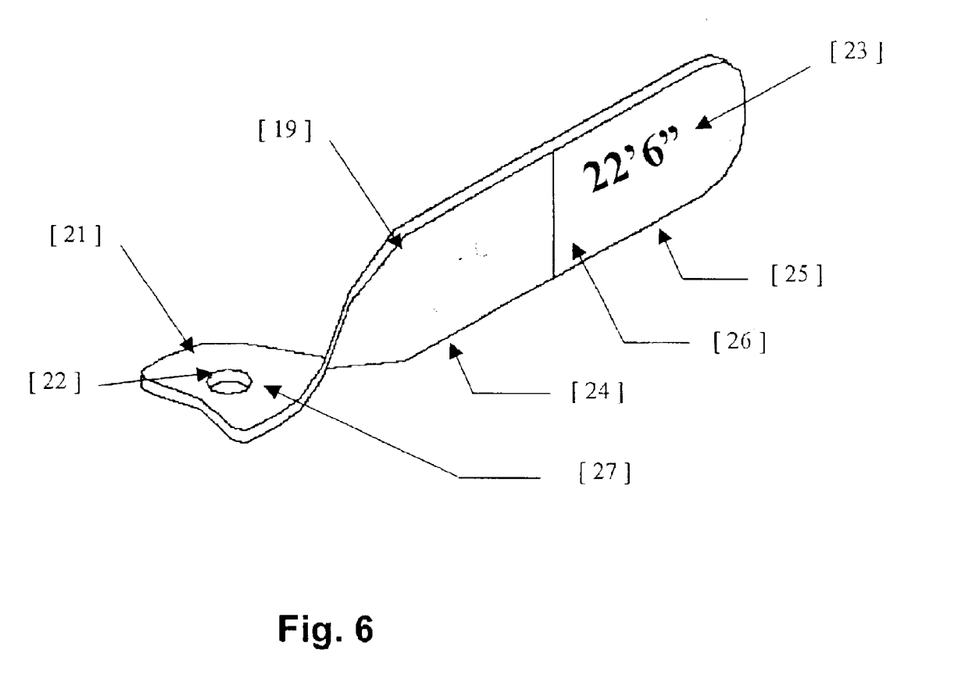
FIG. 6 shows an isometric view of a tide-indicating arm of the present invention.

FIG. 6 shows the isometric view of a tide-indicating arm [14] of the present invention, wherein the said arm is rendered compact and dismountable to achieve improvement in the efficiency of assembly, de-assembly, and packing of the tide-staff system. A circular hole [27] provided on the mounting terminal [21] of the tide-indicating arm permits its mounting to the flange [13] of the tide-staff segment [12] with the use of one of the bolts meant for coupling the two adjacent segments of the tide-staff. The edge of the mounting terminal [21] of the tide-indicating arm [14] is provided with curved shape to permit easy orientation of the tide-indicating arm in any desired orthogonal direction with reference to the axis of the tide-staff. Two mutually orthogonal planes [22] and [23] have been provided to the tide-indicating arm [14] by adequate heat treatment and application of shear forces at appropriate points on its body. The edges of the tide-indicating arm have been rounded to provide excellent aesthetic appearance and optimum fluid dynamic performance. The two mutually orthogonal planes provided to the tide-indicating arm [14] simultaneously achieve elegance, ease in mounting, and enhancement in the readability of the tide level. Demarcating the tide-indicating portion of the arm [14] into two compartments [24] and [25] by a separating line [26] permits indication of tide reading in more than one language including a vernacular language, thereby facilitating utilization of the services of local manpower for registering tide level readings from remote areas such as coastal villages and fishing areas. Tide level indications are provided in the form of numbers on both sides of the tide-indicating arm [19] so that tide level readings can be accomplished from a location/direction that is most convenient to the tide level reader.

Figure 7:
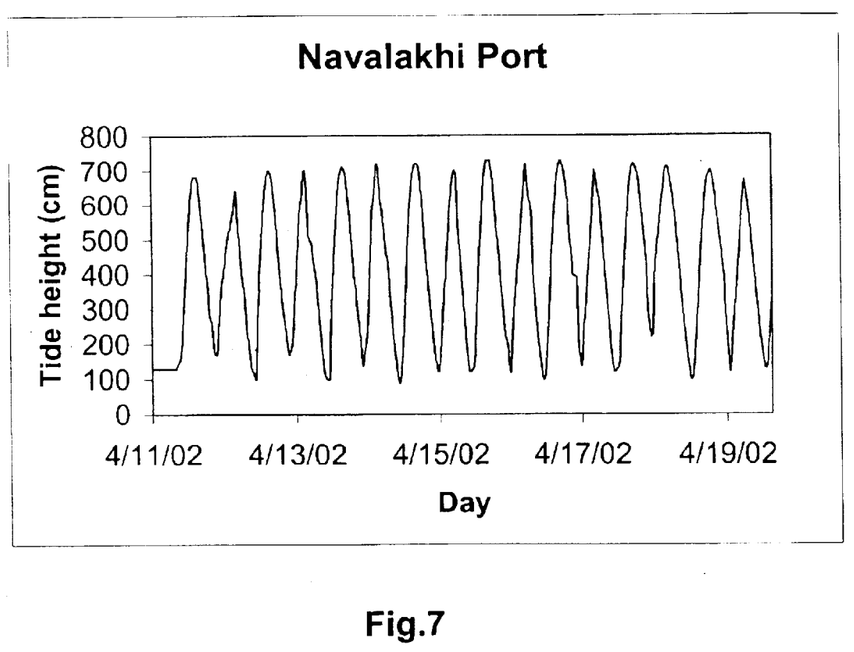
FIG. 7 shows the pattern of tidal motion registered (with reference to the Chart Datum) using the tide-staff of the present invention at Navalakhi jetty located near the tip of the Gulf of Kachch, Gujarat State, India.

FIG. 7 shows the pattern of tidal motion registered (with reference to the Chart Datum) using the tide-staff of the present invention, which was erected at Navalakhi jetty located near the tip of the Gulf of Kachch, Gujarat State, India.

The device of the present invention has been successfully implemented to measure tide levels at many remote locations along the Gulf of Kachch, primarily to perform dynamic calibration of a multiplicity of pressure-based electronic tide gauges deployed in the Gulf of Kachch; and to provide data for calibration of a computer model of tidal propagation in the Gulf of Kachch. It was observed that the device of the present invention was easy to be transported in a small vehicle such as car; easy to be assembled in the field; convenient for tide level observation even in large tidal regime; and easy to be dismounted after tide level measurements over the desired period.

The present invention relates to a segmented cylindrical tide-staff system useful for erection at remote areas and dynamic calibration of electronic tide meters & computer models of tides, which provides for (1) partition of tide-staffs into a multiplicity of desirable smaller segments, thereby enabling their trouble-free transportation to remote areas; (2) easy coupling of any pair of a plurality of separate segments to achieve any desired height for the tide-staff to suit any given installation environment and any given tidal regime; (3) enhancement of unambiguous measurements of tide levels from a distance by providing a pair of protruding tide-indicating arms on either end of each segment; (4) improvement in the efficiency of assembly, de-assembly, and packing of the tide-staff system by rendering the tide-indicating arms compact and dismountable; (5) cylindrical shape to the segments to minimize flow/wave-induced piling-up/piling-down effects and wake effects, and to achieve excellent horizontal azimuthal response to tide-staff in the presence of flows and waves; (6) simultaneously achieving elegance, ease in mounting, and improving the readability of the tide-indicating arm by providing it with two mutually orthogonal planes that are drawn from a single strip; and (7) means for indication of tide reading in more than one languages including a vernacular language, thereby facilitating services of local manpower for making tide level readings from remote areas such as coastal villages and fishing areas.

ADVANTAGES OF THE INVENTION

The main advantages of the present invention are:

1. It facilitates trouble-free transportation of tide-staffs for tide level measurements from any region including remote areas, by providing a means for partition of tide-staffs into a multiplicity of desirable smaller segments.
2. It provides a means for facilitating easy coupling of any pair of a plurality of separate segments of tide-staffs to achieve any desired height for the full-length tide-staff so as to suit any given installation environment and any given tidal regime that occur in nature.
3. It enhances the precision in tide-level measurements using tide-staffs by providing a multiplicity of protruding tide-indicating arms at regular spatial intervals in an orthogonal direction to the axis of the tide-staff. Presence of these protruding arms eliminates the hitherto prevalent ambiguity in the measurements of tide levels from tide-staffs located at far distances from the shore, which is a usual occurrence is slowly sloping beaches.
4. It improves the efficiency of assembly, de-assembly, and packing of the tide-staff system by rendering the tide-indicating arms compact and dismountable.
5. It provides simultaneous achievement of elegance, ease in mounting, and enhancement in the readability of the tide-indicating arm of tide-staff by providing the said tide-indicating arm with two mutually orthogonal planes.
6. It facilitates utilization of the services of local manpower for registering tide level readings from remote areas such as coastal villages and fishing areas by providing means for indication of tide-level reading in more than one language including a vernacular language.
7. It provides excellent horizontal azimuthal response to tide-staff in the presence of water flows and sea-surface waves; and minimization of flow/wave-induced piling-up/piling-down effects and wake-effects at the tide-staff.
8. The edges of the flanges are chamfered to avoid sharp edges, thereby enabling trouble-free handling of the tide-staff segments during transportation, installation, dismounting etc., and minimizing formation of wakes at its edges in the presence of water currents and sea-surface waves.
9. The planes are drawn from a single strip by adequate heat treatment and application of shear force at appropriate points on the body of the said tide-indicating arm. The edges of the tide-indicating arm are rounded to provide excellent aesthetic appearance and optimum fluid dynamic performance.
10. Tide level indications are also provided in the form of numbers on both sides of the tide-indicating arm so that tide level readings can be made from a location/direction that is most convenient to the tide level reader.

What is claimed is:

1. A segmented cylindrical tide staff system for erection at remote areas for dynamic calibration of electronic tide meters and computer models of tides, said tide staff system consisting of a plurality of cylindrical tubes, said cylindrical tube being coupled to a flange at its end through a circular orthogonal hole drilled on a flat surface of the flange, said flange being provided with a plurality of equally spaced slots drilled on the flat surface of the flange, one or more outwardly protruding tide indicating arms being mounted on the flange wherein said tide indicating arm consists of two mutually orthogonal planes, wherein one plane is perpendicular to the axis of the tide staff and the other plane is parallel to the axis of the tide staff, said perpendicular plane being provided with a mounting terminal and a circular hole and said parallel plane being partitioned into two compartments by a separating line, and two or more cylindrical tubes being coupled to each other through slots provided on the flange using coupling means, wherein the flange is coupled orthogonal to the axis of the cylindrical tube, wherein the flange is provided with 3 or more equally spaced slots for coupling two or more cylindrical tubes.

2. A segmented cylindrical tide staff system as claimed in claim 1, wherein threading is provided on an inner of the orthogonal hole.

3. A segmented cylindrical tide staff system as claimed in claim 1, wherein the ends of the circular tube are provided with threading for coupling the tube to the flange.

4. A segmented cylindrical tide staff system as claimed in claim 1, wherein the flange is first tightened to the end of the circular tube and is subsequently welded.

5. A segmented cylindrical tide staff system as claimed in claim 1, wherein the circular tube is subdivided into a plurality of equal segments to facilitate reading of the tide level.

6. A segmented cylindrical tide staff system as claimed in claim 5, wherein adjacent sub segments on the circular tube are painted in two or more differing colors to facilitate reading of tide level.

7. A segmented cylindrical tide staff system as claimed in claim 1, wherein two or more cylindrical tubes being coupled to each other using nuts, bolts and lock nuts.

8. A segmented cylindrical tide staff system as claimed in claim 1, the nuts, bolts and lock nuts are made of stainless steel to prevent rusting during prolonged exposure of the tide staff to saline water medium.

9. A segmented cylindrical tide staff system as claimed in claim 1, wherein the tide indicating arm is mounted in an orthogonal direction to the axis of the tide staff for easily and unambiguously taking the tidal measurements.

10. A segmented cylindrical tide staff system for erection at remote areas for dynamic calibration of electronic tide meters and computer models of tides, said tide staff system consisting of a plurality of cylindrical tubes, said cylindrical tube being coupled to a flange at its end through a circular orthogonal hole drilled on a flat surface of the flange, said flange being provided with a plurality of equally spaced slots drilled on the flat surface of the flange, one or more outwardly protruding tide indicating arms being mounted on the flange wherein said tide indicating arm consists of two mutually orthogonal planes, wherein one plane is perpendicular to the axis of the tide staff and the other plane is parallel to the axis of the tide staff, said perpendicular plane being provided with a mounting terminal and a circular hole and said parallel plane being partitioned into two compartments by a separating line, and two or more cylindrical tubes being coupled to each other through slots provided on the flange using coupling means, wherein two tide indicating arms are mounted on the flange.

11. A segmented cylindrical tide staff system as claimed in claim 1, wherein an edge of the mounting terminal is curved to permit easy orientation of the tide indicating arm in any desired orthogonal direction with reference to the axis of the tide staff.

12. A segmented cylindrical tide staff system as claimed in claim 1, wherein the tide indicating arm is mounted on the flange through the hole provided on the mounting terminal.

13. A segmented cylindrical tide staff system as claimed in claim 1, wherein the tide indicating arm is mounted on the flange using nuts, bolts and lock nuts already provided for coupling two or more cylindrical tubes.

14. A segmented cylindrical tide staff system as claimed in claim 1, wherein an edge of the parallel plane is rounded thereby avoiding injuring persons during transportation, erection, dismounting of the tide staff and providing optimum fluid dynamic performance.

15. A segmented cylindrical tide staff system as claimed in claim 1, wherein markings in the form of numbers are provided on the surface of the parallel plane for reading the tide level.

* * * * *